Oct. 14, 1924.

M. H. WELDY

SIGNALING DEVICE

Filed March 21, 1921 6 Sheets—Sheet 1

1,511,792

WITNESSES
George C. Myers

INVENTOR
M. H. WELDY,
BY
ATTORNEYS

Figures 3, 4, 5, 6:
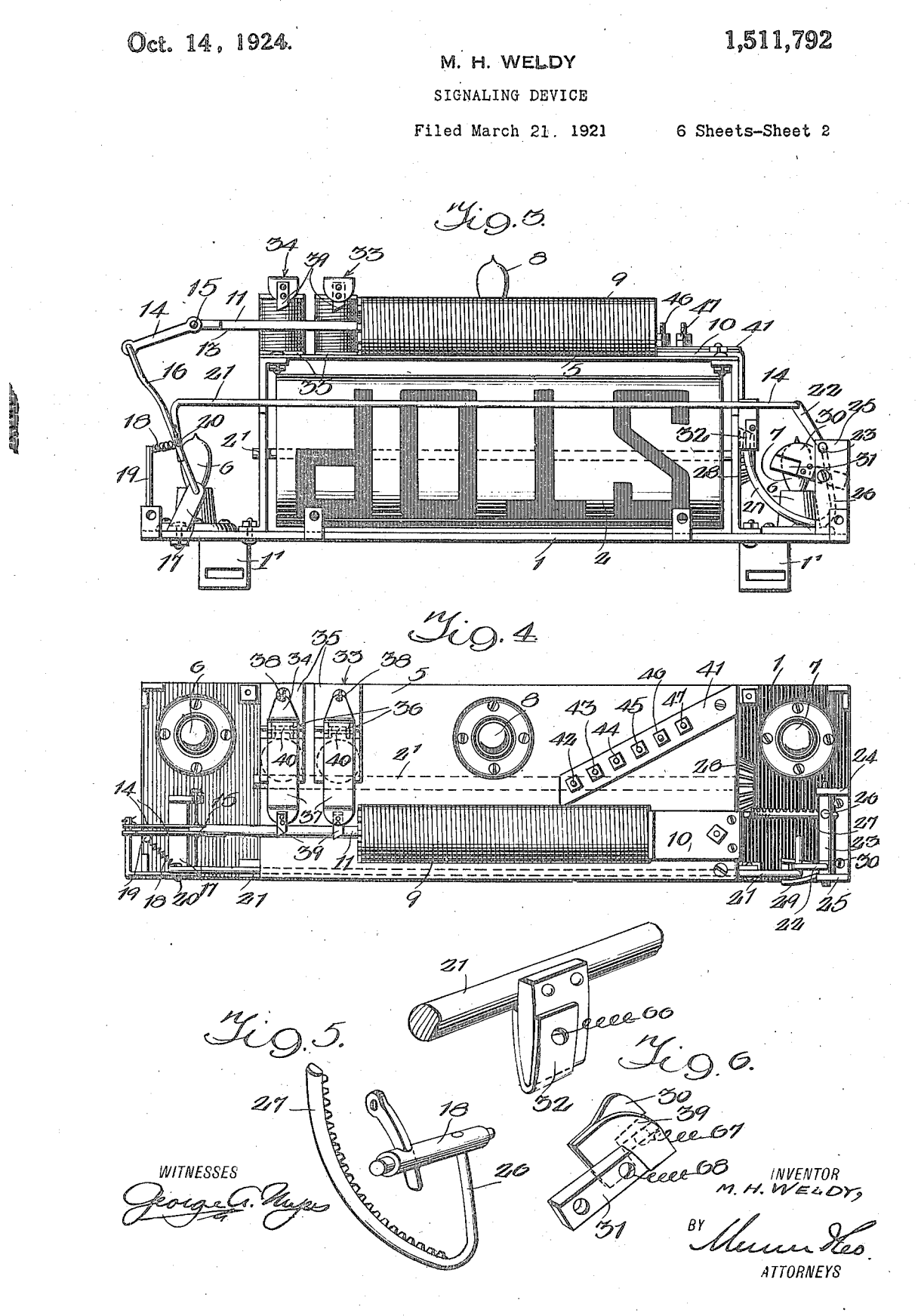

Oct. 14, 1924.

M. H. WELDY

SIGNALING DEVICE

Filed March 21, 1921     6 Sheets-Sheet 2

WITNESSES

George G. Tyler

INVENTOR
M. H. WELDY,

BY

ATTORNEYS

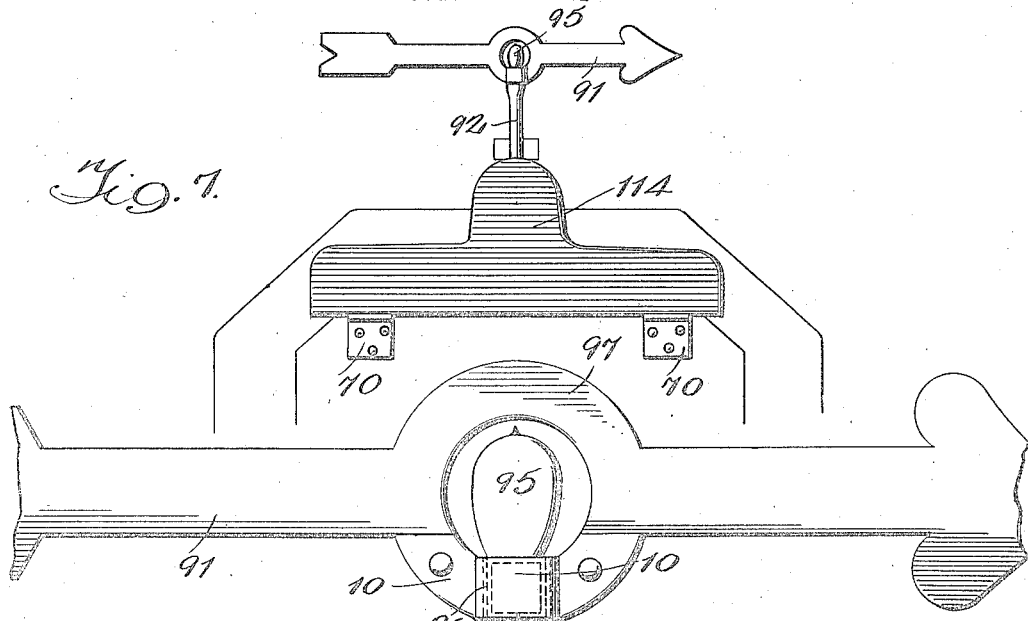
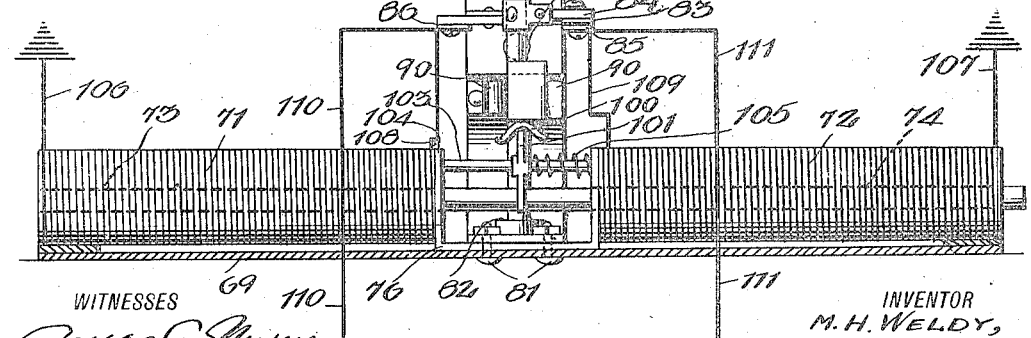

Oct. 14, 1924.

M. H. WELDY

SIGNALING DEVICE

Filed March 21, 1921

INVENTOR
M. H. WELDY,
BY
ATTORNEYS

WITNESSES

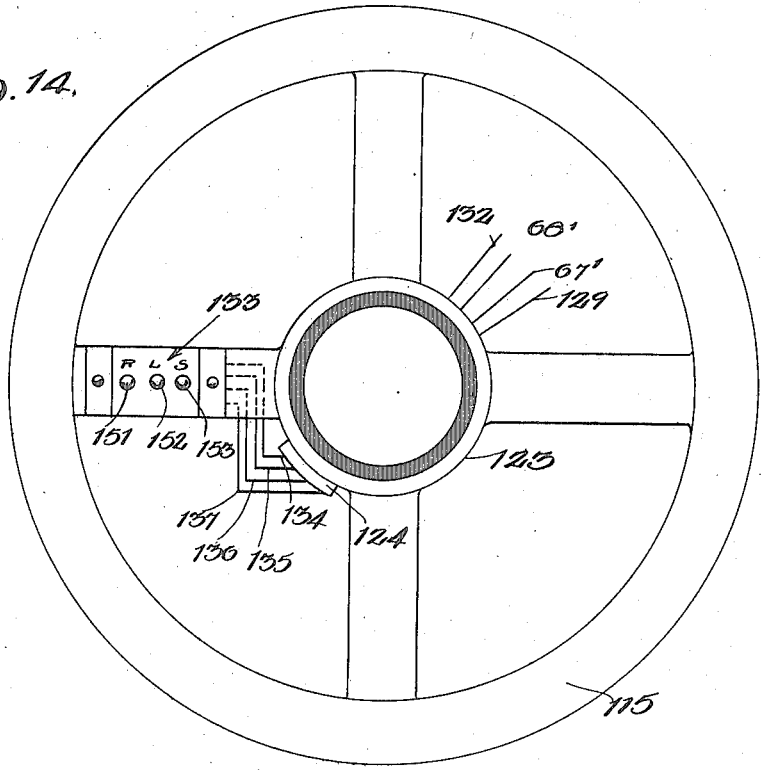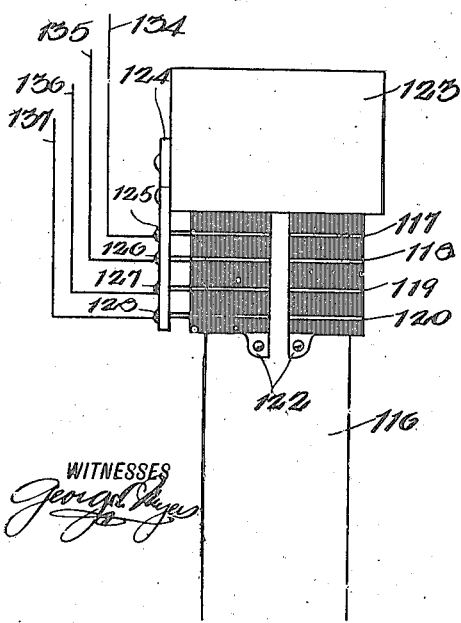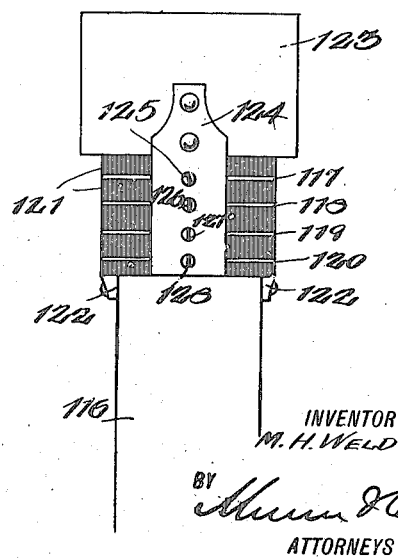

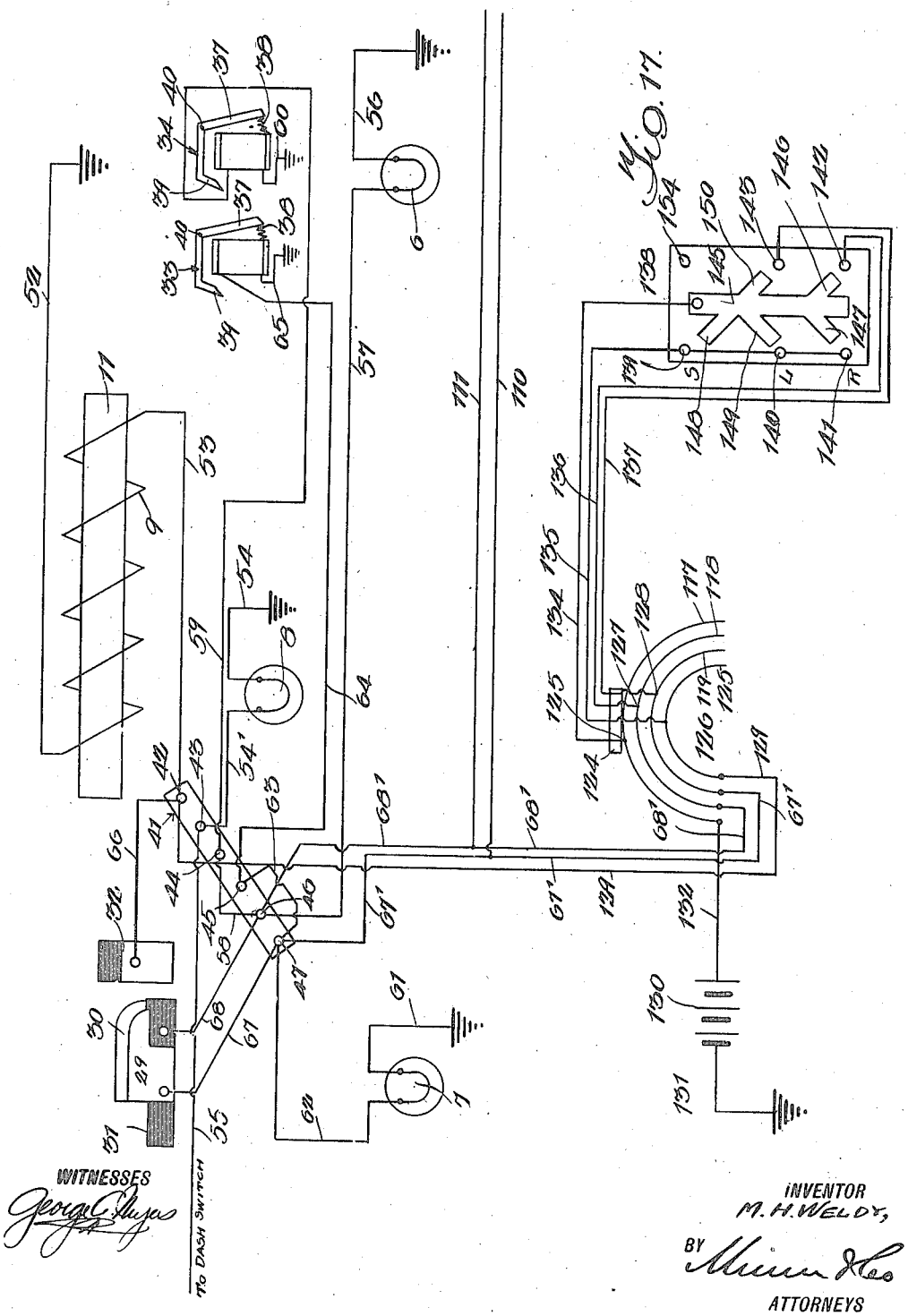

Patented Oct. 14, 1924.

1,511,792

UNITED STATES PATENT OFFICE.

MERRILL HENRY WELDY, OF SEATTLE, WASHINGTON.

SIGNALING DEVICE.

Application filed March 21, 1921. Serial No. 453,967.

*To all whom it may concern:*

Be it known that I, MERRILL H. WELDY, a citizen of the United States, and resident of Seattle, in the county of King and State of Washington, have invented certain new and useful Improvements in Signaling Devices, of which the following is a specification.

This invention relates to traffic signals and more especially to an improved safety signal adopted for use in connection with vehicles and especially motor vehicles or automobiles to permit a driver or chauffeur of one car or vehicle to indicate or warn drivers of other vehicles or cars, in addition to pedestrians, of the direction of movement or travel, whether making a stop, turning to the right or left, or proceeding in the ordinary way, so that such drivers or pedestrians may be instructed in advance of a change of speed or direction of travel and thereby be enabled to meet the conditions so as to avoid accidental collisions between vehicles or with persons, and in general, serving as a safety first device for the regulation of traffic, especially desirable in crowded or congested districts or cities.

It is an object of the invention to provide an adequate safety signal at a very moderate cost, while still retaining the most necessary features, such as reliability, accuracy, durability, etc.

A further object of the invention is to provide signals which will be operated simultaneously at the front and rear of the vehicle, the signals being under control of a switch mounted on the steering wheel and operative irrespective of the position of the wheel, said switch serving to operate the front and rear signals at the same time or at one operation, in order to advise drivers of other cars or vehicles approaching or otherwise, and traffic guards or policemen as well as pedestrians, of the driver's intention to stop or turn to the right or left and so forth, such signals requiring no special code and thereby giving instant instruction or warning, so that traffic may be properly and orderly regulated.

Other and further objects of my invention will become apparent to persons skilled in the art, from a consideration of the following description when taken in conjunction with the accompanying drawings, wherein:

Figure 3 is a rear elevation of the device as shown in Figure 2.

Figure 4 is a top plan view thereof.

Figure 5 is a fragmentary detail perspective view of the driving means of the visual signal device shown in Figures 1 to 4, inclusive.

Figure 6 is a disassembled fragmentary perspective view of a circuit closer, contact or switch employed with the device.

Figure 7 is a front elevation of the front signal and direction indicating device.

Figure 8 is an enlarged front elevation thereof with the cover or case removed.

Figure 10 is a sectional view taken horizontally on the line 10—10 of Figure 8, enlarged.

Figure 14 is a plan of the steering wheel with the switch mounted thereon.

Figure 15 is a detail of the contacts of the steering wheel and post or standard.

Figure 16 is a side view thereof, and

Figure 17 is a diagrammatic view of the complete apparatus and showing the wiring arrangement or diagram.

Figure 1:
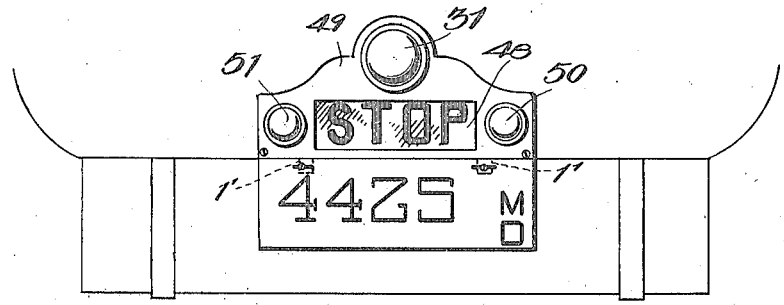
Figure 1 is a front elevation of the rear signal and direction indicating device of the apparatus forming a complete front and rear signal mechanism.
Figure 2:
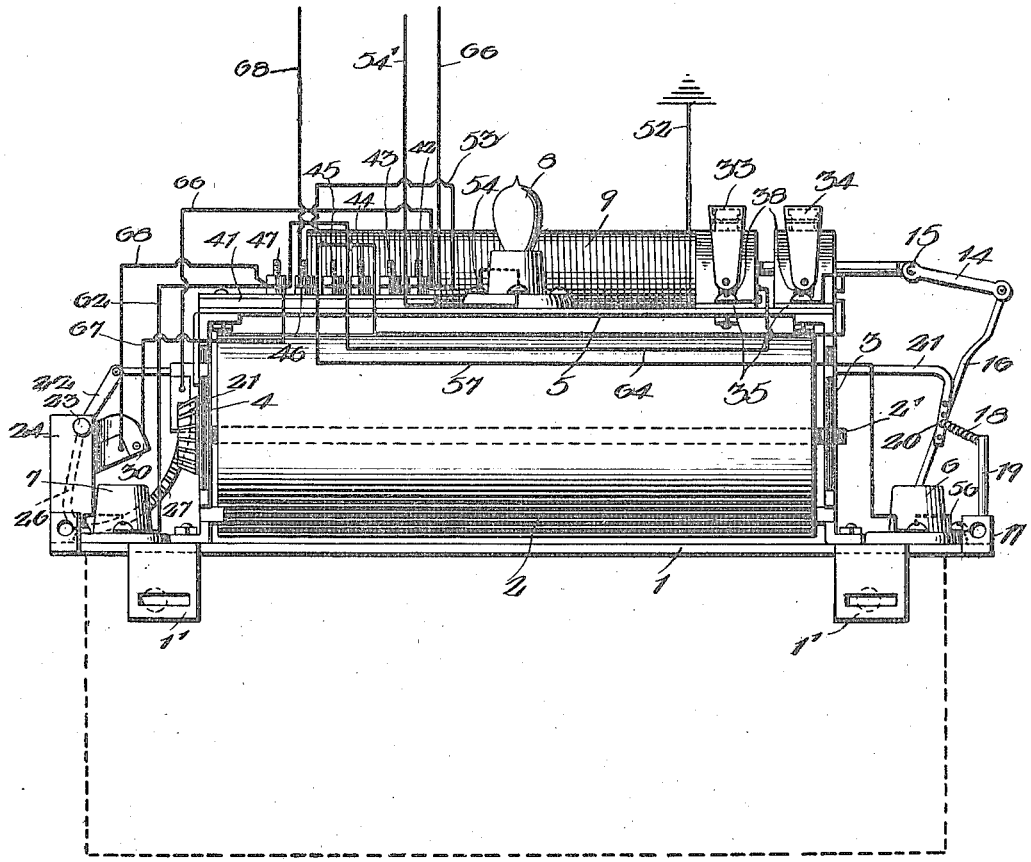
Figure 2 is an enlarged front elevation thereof with the cover removed.

Referring to the drawings in detail, in which like reference characters designate similar or corresponding parts throughout the several views, and referring especially to Figures 1-6 inclusive, the rear signal or direction indicating device is shown as comprising a base or base plate 1 on which is carried all of the mechanism, lights, etc., said base plate being adapted to be secured at the rear of an automobile or other vehicle, according to the use, and preferably to the body at any convenient place, such as at one side in order that the device as well as the usual license tag or tags of the usual type comprising enameled metal plates will be rendered readily visible to drivers of other cars approaching at the rear or following, motormen, drivers of other vehicles and the like. The base plate is provided with the usual or any preferred form of slotted lugs 1' adjacent each end and bent downwardly therefrom in order to effect the attachment of the license tag or plate in the usual fashion, as by bolts or the like.

Rotatably mounted above base plate is a cylinder or drum 2 bearing in large bold type, the words "Right", "Left", and "Stop", the bold face type or letters being readily visible at considerable distance, said cylinder being preferably black and having the letters white and provided with an axial shaft 2' projecting from the ends thereof and rotatably journaled at each end in spaced parallel and vertically arranged or upright end plates or walls 3 and 4 which are secured to the base plate at spaced points from the ends thereof and provided with suitable apertures or bearings for the shaft or projecting ends thereof in order that the cylinder may be supported for free rotation in a horizontal position. These end plates or walls 3 and 4 are braced in the positions stated and connected by a top plate 5 which forms a supporting plate for certain of the mechanism as will be further described, the end plates as well as the top plate if desired, being provided with suitable right angularly extending or apertured attaching lugs or ears for securing the parts together, for this purpose.

Arranged upon the projecting ends of the base plate outwardly of the end plates are suitable upright sockets for supporting electric light bulbs constituting the right and left lamps 6 and 7 respectively, while upon the top plate 5 is centrally arranged a similar electrical socket and bulb 8, all of said lamps being of the proper standard size, power or voltage, said lamp 8 constituting the tail light of an automobile and being wired in series with the dash light, or in other words, just as the ordinary tail light for illuminating the license sign or tag in the usual manner. Also arranged upon the top plate 5 is a longitudinally extending solenoid 9 which is secured in position by a bracket 10 disposed at one end thereof and having suitable screws securing it to the top plate, while the armature of the solenoid is designated at 11 and operates therein, said armature consisting of a soft iron or steel bar or the like and having a longitudinally extending notch 12 producing a shoulder 13 at its outer end and near the adjacent end of the armature, said notch facing rearwardly and adapted for a purpose to be hereinafter explained.

The outer end of the armature is reduced and apertured as shown for pivotal connection therewith of a pair of spaced links 14, as shown at 15, said links being preferably of brass to overcome magnetism on the lever 16 to which the outer ends of the links are pivotally connected. The lever 16 is of angular formation, the end thereof to which the links are connected being horizontally extended inwardly at right angles to the lever proper which is disposed in an inclined position and is pivotally mounted or supported upon the base plate at its inwardly extended lower end in a bracket 17 rigidly mounted on the base plate and having spaced sides forming journals for the shaft which is suitably held against displacement or end thrust. In order to restore the mechanism to a neutral position by holding the lever in an outward position on its pivot so as to draw the armature outwardly to an inoperative position where it may be attracted to a retracted position within the solenoid, when the latter through its coils is energized as will be later explained, a retractile coil spring 18 is connected to the lever and to the base plate through the instrumentality of an upright or binding post 19.

Connected intermediately to the lever 16 adjustably and pivotally at the point of connection of the spring therewith, as shown at 20 is the depending end of a connecting rod 21 which extends horizontally across the device in back of the cylinder and has its other end directed forwardly at right angles in a horizontal position to pivotally connect or extend through an apertured arm 22 of a shaft 23 horizontally pivoted at its ends in spaced brackets or plates 24 and 25 mounted in parallel relation on the opposite projecting end of the base plate, said brackets also forming a support for the shaft and an arm 26 depending therefrom rigidly and formed with an upwardly and inwardly curved concentrically arcuate segmental rack or drive gear 27 disposed to mesh with a beveled pinion 28 mounted on the adjacent projecting end of the shaft of the cylinder so as to operate and rotate in unison, owing to the pinion being fixed to the shaft and the cylinder being fixed thereto also. Carried by the rear bracket 25 also, are a pair of contact plates 29 and 30 which are fixed to an insulated arm 31 of fibre, hard rubber or the like mounted on said bracket rigidly in a horizontal position so as to extend inwardly, said plates being disposed in divergent relation toward their inner ends and adapted to cooperate with a movable contact member 32 fixed to the link or connecting rod 21, and which is insulated from and extends downwardly from said rod to move into and out of engagement or contact with the spaced contact plates 29 and 30, since the latter are mounted upon opposite sides of the dielectric support or insulator arm 31, in order to electrically separate the same whereby the circuit therethrough will be normally open except when the movable contact or bridge piece 32 engages said plates.

Also mounted upon the supporting plate or top of the cylinder frame are a pair of electro-magnetic stops 33 and 34 for the left and right positions of the cylinder respectively, each comprising a winding disposed around a suitable core, the upper end of which is exposed through an attaching and supporting plate in the form of a bracket 35 of conducting material suitably secured to and insulated from the top or supporting plate upon which the same are mounted. These brackets are provided with spaced apertured ears 36 pivotally supporting right angularly or otherwise shaped armatures or armature levers 37 which have their forward ends extending downwardly and connected to retractile coil springs 38 anchored to the electro-magnet supports in order that the opposite sides or ends of the armatures will be normally drawn away from the notched portion of the armature 11 and raised or elevated out of contact with the cores of the magnets when the latter are deenergized. These armatures are preferably of flanged metal, if desired, with soft metal armature portions properly disposed over the cores to be attracted thereby when the magnets are energized in circuit, and in order that the armatures may act as stops, the depending ends adjacent the armature 11 upon which magnetic pull is exerted by the magnetization of the solenoid 9 to supply the necessary power or force to operate or work the mechanism which turns the cylinder to either of the positions mentioned, the degree of rotation or oscillation of the cylinder being varied and controlled according to the signal desired, are provided with tapered or pointed and angularly beveled or sharpened stop pieces 39 projecting therefrom adjacent to the armature 11 so that as the armatures of the stops 33 and 34 are moved on their pivots 40 engaged through the opposed spaced and cooperating ears of the brackets and armatures respectively, said stop pieces will by being fastened to the armatures, engage the notch 12 of the armature 11 at the required time to prevent further movement thereof when the solenoid is energized to attract the same. This action is assisted by the engagement of the flat beveled faces of the stop pieces with the flat wall of the notch and the frictional action exerted therebetween, the shoulder or end wall of the notch serving to limit the movement of the armature in the direction in which it is retracted, while the formation of the stop pieces or engaging ends of brass, avoids magnetic action thereon.

Also mounted upon the top or supporting plate is a terminal block 41 of fibre or the like on which are arranged a series, preferably six binding posts 42, 43, 44, 45, 46 and 47 to facilitate the fastening and arrangement of the various circuit wires as shall be later described, said block being secured to and insulated from the top or supporting plate preferably at the end remote from the magnetic stops. At the front of the cylinder is arranged a glass or other transparent panel 48, while over the entire arrangement is disposed a cover, hood or casing 49 to protect the apparatus and exclude rain, dust, etc. This housing is provided in front of each of the electric bulbs with lenses 50 and 51 over the lamps 6 and 7 respectively, in addition to the red tail light lens 31, of standard size, said lenses 50 and 51 being also preferably red and adapted to be illuminated below and at either side of the tail light for a night signal, as well as supplying light for its respective sign or cylinder indication, to indicate right or left turns, or a stop as heretofore referred to.

The right lamp 6 is wired in parallel with the right electro-magnetic stop 34 and lights when the cylinder moves the sign or indication "Right" into position, while the left lamp 7 is wired in parallel with the left electro-magnetic stop 33 and lights when the cylinder moves the sign or indication "Left" into position. Both of the lamps are also wired to the contacts 29, 30 and 32 constituting an automatic switch, so that when the cylinder moves the sign or indication "Stop" into position, both the lamps 6 and 7 will be placed in circuit and ignited or illuminated to indicate the stopping of the vehicle. One of the terminals of the winding of the solenoid 9 is grounded through a conductor 52 and the other terminal is connected by a wire or conductor 53 with the binding post 42. The tail light 8 is grounded through a conductor 54 at one terminal and the other terminal is connected to the binding post 43 and then leads through a conductor 55 to the dash switch, being wired in series with the dash light in the manner of the ordinary tail light and acting by reason of the fact that the lower portion of the cover 49 is open, to illuminate the license sign or tag as required.

The lamp 6 at the right has one terminal grounded through a conductor 56 and the other terminal connects with a conductor 57 through the binding post 46 then to the binding post 44 through a conductor 58, and then by a conductor or lead 59 to the corresponding magnetic stop 34 at one terminal of the latter, while the other terminal is grounded through a conductor 60. The lamp 7 at the left has one terminal grounded through a conductor 61, and the other terminal connects by a conductor 62 to the binding post 47 which in turn is connected to the binding post 45 through a conductor 63 and then leads through a conductor 64 to the other magnetic stop 33 at one terminal of the latter, the other terminal being grounded through a conductor 65. The movable contact 32 is connected by a conductor 66 with the binding post 42 and thus to the supply wire 53 from the solenoid and in parallel therewith. The contact 29 is connected by a conductor 67 with the binding post 47 and the contact 30 is connected by a conductor 68 with the binding post 46, the movable contact being thus connected in parallel with the solenoid so that in its left, right and neutral positions, the circuit remains open, but in the stop position or at the extreme end of its travel, it comes in contact with the stationary contacts or contact plates 29 and 30 which are connected to the lights 6 and 7, putting them in parallel with the solenoid so as to ignite the lamps or lights 6 and 7 by placing them in circuit.

The front signal or indicating device may be mounted on the hood or otherwise positioned at the front of the car, and comprises a base 69 arranged upon brackets 70 and having horizontally disposed thereon in spaced relation and in alinement, right and left hand solenoids 71 and 72 respectively in which operate right and left solenoid armatures 73 and 74 preferably formed as a continuous soft iron or steel bar in one piece with each end extending into the winding of its corresponding solenoid and formed with a rack or teeth 75 intermediately. Arranged between the solenoids 71 and 72 is a U-shaped bracket 76 in conjunction with a guide for the rack bar and armatures so that the teeth 75 are disposed to mesh with a pinion 77 fixed to a vertical shaft 78 rotatably journaled through the upper and lower spaced parallel portions or jaws of a U-shaped frame or bracket 79 comprising adjustable sections separably connected as indicated at 80 and detachably mounted upon the elongated transverse base 69, as indicated at 81, while the hub 82 of the shaft 78 rotatably supports the shaft against displacement. The shaft has fixed thereto a movable contact member 83, which is insulated therefrom, being supported by a horizontal fibre arm 84 rigid with the shaft and arranged to swing into engagement with opposed oppositely extending stationary contacts 85 and 86 carried by an insulated support 87 suitably attached to the bracket 79 in a plane below the arm 84, said support 87 being preferably of fibre and attached by the angle plate 88 to the vertical connecting portion of the bracket or frame 79.

The shaft 78 is provided with a horizontal projection or cam 89 and the frame or bracket 79 carries a pair of springs 90 arranged on edge and extending horizontally on either side of the vertical shaft so as to engage the cam and normally hold the cam and shaft in a neutral or central position so that an arrow 91 mounted on the upper end of the shaft 78 through the medium of a tubular extension 92, will be disposed to normally point ahead or forwardly to indicate forward travel. The tubular extension 92 is detachably secured to the upper end of the shaft proper immediately above the top of the frame or bracket 79, as indicated at 93, said tube being slotted as indicated at 94 to receive a conductor extending from the movable contact 83 to a lamp or incandescent electric light bulb 95 mounted in a socket 96 at the upper end of the tube and accommodated in a ring like or apertured enlargement 97 intermediately of the length of the arrow or pointer. The connection between the arrow and the tubular portion of the shaft is effected by opposite jaws or semicircular clamping plates 98 having the ends thereof riveted to opposite sides of the portion 97, as indicated at 99. The head of the arrow is preferably red so as to render the same more readily discernible in conjunction with the electric lamp or bulb 95 which is also preferably colored red. The arm 84 is in the form of a block or stationary cross arm and the contacts 86 and 85 are detachably secured thereto and project therefrom at right angles for engagement by the movable contact 83 when the latter is swung to either side by the energization of one of the solenoids 71 or 72, the springs 90 serving by engagement with the cam 89 to limit the movement in conjunction with the cross arm 87 engaging the arm 84 at either side. If desired, means may be provided to normally hold the parts in a neutral position, consisting of a latch comprising a keeper 100 fixed to the shaft 78 and being of concaved or hood-like formation presenting a grooved bottom surface adapted to receive the upper short arm 101 of an obtuse-angled lever or bolt including a longer arm 102. The pivoted part 100 is adapted to engage the arm 101 in the normal position of the parts with the arrow pointing forwardly, the lever being fixed to a horizontally pivoted shaft 103 journaled at its ends for oscillatory movement in apertured extension or ears at the ends of the bracket 76, as indicated at 104 so that the long arm will lie adjacent to the intermediate portion of the double armature, or the intermediate portion of the bar between the armatures 73 and 74 opposite the rack bar or teeth 75. A coil spring 105 wound on the shaft 103, has one end fixed thereto and the other end fixed to the adjacent end of the bracket which is stationary, and the spring normally holds the lever in a locked position by turning the shaft so that the arm 101 will be engaged beneath the keeper 100 while the arm 102 is spaced from the armature but will be attracted thereby owing to the magnetic action when a solenoid is energized to attract an armature, thus drawing the arm 102 downwardly to rock the lever on its pivot or shaft and with the same against the action of the spring to wind the latter and disengage the arm 101 from beneath the keeper in order that the shaft of the pointer or arrow and thus the arrow may be swung to the right or left as desired in order to indicate the intended movement of the vehicle provided with the signal, at the front as well as at the rear of the car.

Figure 9:
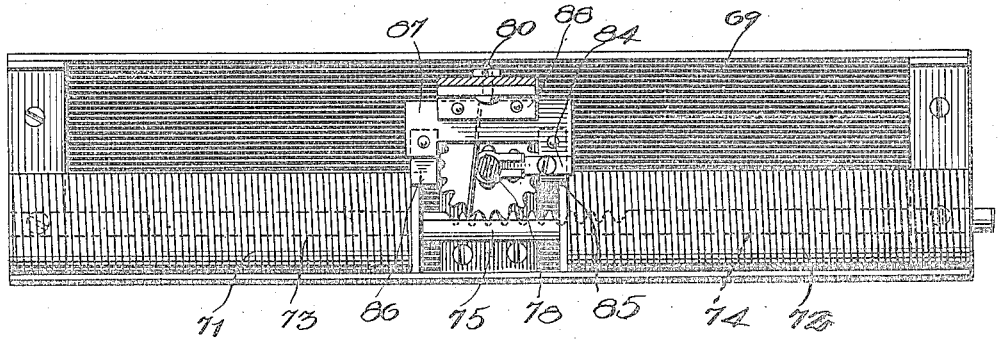
Figure 9 is a horizontal sectional plan view of the device as shown in Figure 8, taken on the line 9—9 of Figure 8.
Figure 11:
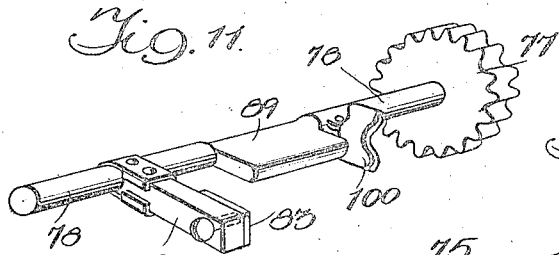
Figure 11 is a detail perspective view of the shaft of the front signal or arrow and operating means thereof.
Figure 12:
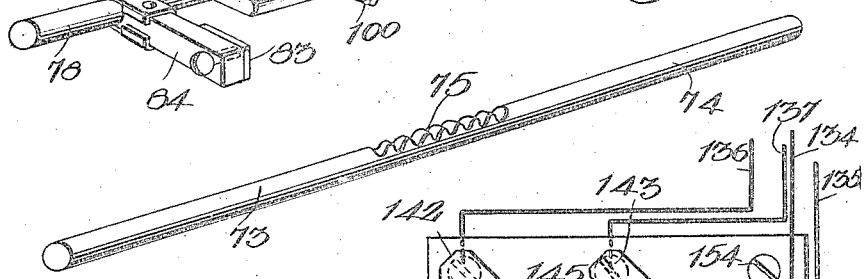
Figure 12 is a similar view of the armature of the front signal.

The solenoids 71 and 72 are each grounded at one end of the coils thereof by conductors 106 and 107, the other ends or terminals being connected by conductors or leads 108 and 109 to the stationary contacts 85 and 86 from which extend conductors 110 and 111 which have connection with the rear signal circuit, as will be hereinafter set forth. The movable contact 83 has connection with the lamp 95 by means of an insulated conductor 112 at the upper end of the shaft, the tubular portion carrying a socket as heretofore described to which the conductor is connected, while the shaft in turn is grounded by the lead 113 as indicated particularly in Figure 8 of the drawings. In this way, the lamp will be placed in circuit when swung to the right or left with the arrow and the movable contact engages the corresponding contact 85 or 86 through which the circuit is completed in each instance as the corresponding solenoid is energized to oscillate as above described, the shaft 78, while the springs 90 by engagement with the cam 89 serve to automatically return the parts to a neutral position when the solenoids are deenergized. Obviously, the solenoids 71 and 72 are normally and directly connected in an open circuit with the source of energy through the conductors 110 and 111 and the lamp 95 is placed in series therewith or in multiple, when the circuit is closed through a solenoid to turn the shaft 78 and bring the contact 83 into engagement either with the contact 85 or the contact 86. In order to protect the mechanism, a cover 114 is provided, the same being connected with the base 69 and having a central vertical projection to accommodate the intermediate parts and apertured to receive the tubular shaft, thus protecting the working mechanism from rain, etc. These parts are shown in Figures 7 to 12 inclusive.

Figure 13:
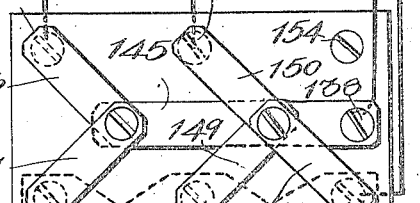
Figure 13 is a detail view of the control switch of the signals.

Referring especially to Figures 13 to 16 inclusive, there is shown a controlling means or switch for the mechanism adapted especially to be mounted on and used in connection with the steering wheel designated at 115 mounted on the steering column or post 116 which is stationary and tubular to receive the usual steering standard therein adapted to rotate or turn with the wheel. The post carries a series of copper strips or contact rings 117, 118, 119, and 120 insulated by fibre sections 121, said rings being preferably made in two units of semi-circular form or comprising opposed clamp jaws secured to the standard or post in any suitable manner as indicated at 122. The hub 123 of the wheel 115 is provided with an attached fibre or insulating block 124 which is secured in position to overhang the rings or stationary contacts produced thereby, said fibre block having a corresponding number of movable contacts and binding posts 125, 126, 127, and 128 extending inwardly to engage the corresponding rings or stationary contacts 117, 118, 119, and 120 and be maintained in contact therewith irrespective of the steering wheel position.

The conductors 110 and 111 from the front signal solenoids lead to conductors 67' and 68' continued from the binding posts 46 and 47 and connected to the contact strips or rings 118 and 119, while a conductor 129 from the post 42 is connected to the ring 120, while the ring 117 is connected to the batteries or other suitable source of energy 130 for electricity or current at one side, post or terminal, the other side or terminal being grounded through a conductor 131. The wires or conductors from the stationary contacts or rings on the housing of the steering post or column to the various parts of the mechanism, including the conductor 132 leading from the ring 117 to the source of energy, are extended along the dash side of the steering column, being connected to the respective stationary contacts or rings and suitably insulated. These conductors are designated at 67', 68', 129 and 132, and while four contacts are shown, any number may be employed as found desirable or necessary, for light dimmer switch, etc. With this device, all switches can be conveniently mounted on the steering wheel and all loose wires are eliminated, the contacts being made in halves so that they may be readily applied to any car.

The controlling switch is generally designated at 133, being mounted on one of the spokes of the steering wheel so that the movable contacts 125, 126, 127, and 128 are connected by the conductors 134, 135, 136, and 137 with the binding posts or terminals 138 to form a lead from the source of energy, posts 139, 140, and 141, which latter all connect with the conductor 135, post 142 and post 143 respectively. That is, the contacts 139, 140, and 141 are joined by a conductor or strip 144 forming a continuation of the conductor 135, while the plate 145 is continued from the conductor 134 in the form of a strip to which are secured contact strips or movable contacts 146 and 147 cooperating with but normally spaced from the contacts or terminals 141 and 142, while similar strips 148, 149, and 150 are also connected to the main strip 145 and engage the contacts 139, 140, and 143 in order to close the circuits through the various signals "Stop," "Left," and "Right" or otherwise, as desired. This is effected by pushing the buttons 151, 152, and 153 so as to close the circuit by the strips 146 and 147 across the contacts 141 and 142 so that the circuit is traced from the source of energy 130 through 132, 117, 125, 134, 145 to conductors 135 and 136, 127, 118, 68', 57 to lamp 6 and at the same time through conductors 58 and 59 to the right stop 34, checking the movement of the armature 11 and the turning of the cylinder to designate "Right." The other circuits are correspondingly traced when closed across the contacts 140 and 143, and 139 and 154 to the "Left" and "Stop" signals respectively, the lamp 8 being lighted with either lamp 6 or 7 or with both of them when the stop signal is given, while the stop 33 serves to check the movement of the armature and cylinder when the left lamp 7 is lighted in the same manner as described in connection with the lamp 6. When the armature completes its movement, the contact 32 engages the contacts 29 and 30 to close the circuit through the source of energy in order to light both of the lamps 6 and 7 when the stop signal is brought to view. The circuits will be similarly controlled through the front signal to cause the two to operate simultaneously or in unison with the same signal.

In view of the foregoing, it is thought that the operation of the device will be readily understood and in view of the simplicity and practical value, that it will readily commend itself to those skilled in the art. Also, while I have described what is generally considered to be the preferred embodiment of the invention, it will also be understood that minor changes in the details of construction, form, shape and arrangements of parts may be made without departing from the spirit of the invention, so long as the same shall be found within the spirit or scope of the invention as claimed.

Having thus described my invention, what I claim is:—

In a device of the character described, a rotatably supported cylinder having a plurality of direction-indicating indicia spaced circumferentially of the periphery thereof, said indicia constituting the words "Stop," "Right," and "Left," a solenoid arranged in parallel relation to the cylinder, a solenoid armature protruding from one end of the solenoid and having a notch in the projecting portion thereof, means arranged between the solenoid armature and the cylinder for rotating the latter when the solenoid armature is moved axially, a plurality of swingingly supported juxtaposed stops each adapted to engage the notch of the solenoid armature, elastic means normally holding said stops out of position to engage the notch of the solenoid armature, an electro-magnetic device for each stop and each being adapted when energized to move the stop member associated therewith into position to engage said notch, means for occasioning energization of said stop controlling electro-magnetic means selectively and the solenoid coincidently with any one of the stop controlling electro-magnectic means, two incandescent lamps respectively positioned at the right and left of the direction indicating cylinder, means associated with the stop controlling electromagnetic operating means for energizing the lamp at the left of the cylinder when the "Left" signal is given and to energize the other lamp when the "Right" signal is given, and means associated with the cylinder rotating means for energizing both lamps simultaneously when the "Stop" signal is given.

MERRILL HENRY WELDY.